United States Patent [19]
Fulmer et al.
[11] Patent Number: 4,685,491
[45] Date of Patent: Aug. 11, 1987

[54] ACCUMULATOR HAVING FLUID-LUBRICATING SEALS

[75] Inventors: Keith H. Fulmer, Mishawaka; Donald J. Baker, South Bend, both of Ind.

[73] Assignee: Allied Corporation, Morristown, N.J.

[21] Appl. No.: 896,488

[22] Filed: Aug. 14, 1986

[51] Int. Cl.[4] .................... F16L 55/04
[52] U.S. Cl. .................... 138/31; 138/30
[58] Field of Search .................... 138/30, 31, 26; 417/540; 220/85 B; 92/94

[56] References Cited

U.S. PATENT DOCUMENTS 3,467,140 9/1969 Hanson .................... 138/31

FOREIGN PATENT DOCUMENTS 711107 6/1954 United Kingdom .

*Primary Examiner*—James E. Bryant, III
*Attorney, Agent, or Firm*—Larry J. Palguta; Ken C. Decker

[57] ABSTRACT

The accumulator comprises a housing (12, 212) having a bore (16, 216) extending longitudinally within the housing (12, 212), a piston (26, 226) disposed slidably within the bore (16, 216) and dividing the bore (16, 216) into first (18, 218) and second (20, 220) chambers. The piston (26, 226) has a bore (30, 230) with a bore opening (36, 236) at the first piston end (27, 227), the bore opening (36, 236) being enclosed by a sleeve member (70, 271). The sleeve member (70, 271) extends longitudinally away from the piston bore (30, 230) and into the first chamber (18, 218), the sleeve member (70, 271) having a sleeve opening (78, 273) permitting high pressure fluid contained within the first chamber (18, 218) to communicate freely with the piston bore (30, 230). A lubricating fluid (60, 260) is disposed about the first piston end (27, 227) and is prevented from entering into the piston bore (30, 230) by means of the sleeve member (70, 271). The sleeve member (271) may be biased away from the piston (226) by means of a spring (288) disposed within the piston bore (230).

11 Claims, 2 Drawing Figures

ACCUMULATOR HAVING FLUID-LUBRICATING SEALS

The present invention relates generally to a pressure accumulator, and particularly to an accumulator having seals about the piston lubricated by hydraulic fluid.

Many accumulator designs have been provided over the years in order to provide a reservoir of pressure that may be utilized in particular situations, particularly in hydraulic braking systems. An accumulator typically includes a piston having seals disposed about each end thereof between the respective piston end and the bore of the accumulator housing. A long standing problem with accumulators is the escape of high pressure gas, for example, nitrogen, from a first chamber of the accumulator past the seals disposed about the periphery of the piston and into the hydraulic brake fluid contained in a chamber at the other end of the piston. When the pressurized gas escapes past the seals and enters into the hydraulic brake fluid, the hydraulic brake fluid provides a spongy or mushy feel and performance for the brake system. Therefore, many different proposed solutions have been provided for maintaining these seals so that the high pressure gas will not escape into the hydraulic brake fluid. The present invention provides an accumulator which prevents the high pressure gas in the first chamber of the accumulator from escaping past the seals at the periphery of the piston. A lubricating fluid is disposed within the first chamber and about the first end of the piston, so that lubricating fluid will coat the housing bore and thereby lubricate the seals disposed about the perimeter of the piston, the lubrication of the seals maintaining them in their proper position and form throughout the useful life of the accumulator. Additionally, the present invention permits a larger volume of pressurized gas to be contained within the first chamber, by extending the first chamber to include the bore of the piston. Because the piston includes a bore, it is possible to provide a piston with a shorter longitudinal length and which weighs less, in addition to containing a larger volume of pressurized gas within the combination of the first chamber and piston bore. Thus, if any gas should escape from the first chamber, the extra amount of gas available will insure that there is adequate pressure for the accumulator to operate during its projected life span.

The present invention comprises a pressure accumulator with a housing having a housing bore extending longitudinally within said housing, a piston having first and second piston ends disposed slidably within the bore and dividing the bore into respective first and second chambers, first and second fluids within the respective chambers, characterized in that the piston has a U-shaped shaped cross section including a piston bore extending from a bore opening at the first piston end, the first piston end and second piston end having respective sealing means thereat, the first fluid under high pressure within the first chamber and a lubricating fluid disposed in said first chamber at the first piston end, the bore opening of the piston bore being enclosed by a sleeve member received within the bore opening and extending longitudinally away from said first piston end and into said first chamber so that the lubricating fluid remains at the first piston end and does not enter into the piston bore, and the sleeve member having a sleeve opening permitting the first fluid under high pressure in the first chamber to communicate freely with the piston bore.

The present invention is described in detail with reference to the drawings which illustrate embodiments of the invention in which.

Figure 1:
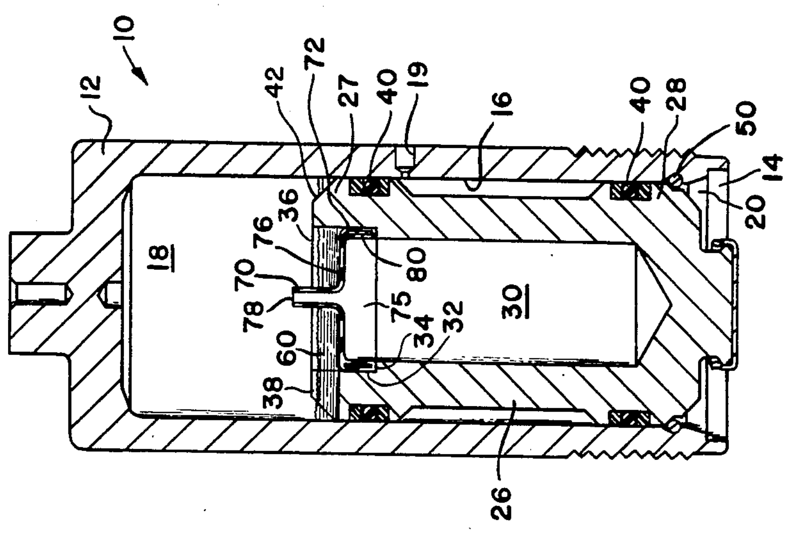
FIG. 1 is a section view of the first embodiment of the invention.

The pressure accumulator of the present invention is designated generally by reference numeral 10 in FIG. 1. Accumulator 10 comprises a housing 12 having an open end 14 communicating with a housing bore 16. Housing bore 16 is split into first chamber 18 and second chamber 20 by piston 26. Piston 26 includes a piston bore 30 so that piston 26 has a U-shaped cross section. Piston bore 30 extends into an enlarged diameter section 32 with a shoulder 34 therebetween. Seals 40 are disposed about the first piston end 27 and second piston end 28. An additional ring 50 is disposed about the second piston end 28. Housing bore 16 communicates with the atmosphere via vent 19. First piston end 27 includes a bore opening 36 communicating with piston bore 30. A radial slot 38 provides communication between bore opening 36 and the beveled surface 42 disposed at first piston end 27. A small amount of lubricating fluid 60, such as hydraulic brake fluid, silicon fluid, or mineral oil, is located at first piston end 27, the accumulator 10 being positioned vertically within an automotive vehicle. The hydraulic brake fluid extends between the adjacent surface of bore 16 to the central area of opening 36. Located within the enlarged diameter section 32 of piston 26 is an annular sleeve member 70. Sleeve member 70 has an enlarged diameter portion 72 and a small diameter section 74 joined by radial section 76. Sleeve member 70 includes a sleeve opening 78 which is a through opening between the small diameter section 74 and central opening 75 of enlarged diameter portion 72 in order to permit gas under high pressure, i.e., nitrogen, to communicate freely between first chamber 18 and piston bore 30. Sleeve member 70 includes an annular metal or steel insert 80 which further strengthens the sleeve member, the member 70 being positioned longitudinally by shoulder 34 of piston 26.

When accumulator 10 is mounted within an automotive vehicle (not shown), the accumulator is positioned vertically as illustrated within FIG. 1. The lubricating fluid 60 is disposed about the first piston end 27 so that as the piston 26 reciprocates within the bore 16, the lubricating fluid will leave a fine film on the surface of bore 16 and lubricate seals 40. Because seals 40 receive lubrication during the operation of accumulator 10, seals 40 retain their structural integrity and operational characteristics throughout the life span of the accumulator. Thus, a projected ten-year life span for the accumulator may be accomplished. In addition, the accumulator includes a smaller and lighter piston because the piston bore is utilized for storing gas under pressure. The piston may be designed to be shorter and is lighter because less material is required to manufacture the piston, and a larger volume of gas may be stored within the combination of the first chamber and piston bore. The larger volume of high pressure gas stored within the accumulator 10 enables further assurance that the extended life span of the accumulator will be accomplished because if any gas should escape by the piston and into the hydraulic brake fluid within the second chamber, the extra amount of gas stored within chamber 18 and piston bore 30 ensures that there will be adequate high pressure gas for the operational life span of the accumulator.

Figure 2:
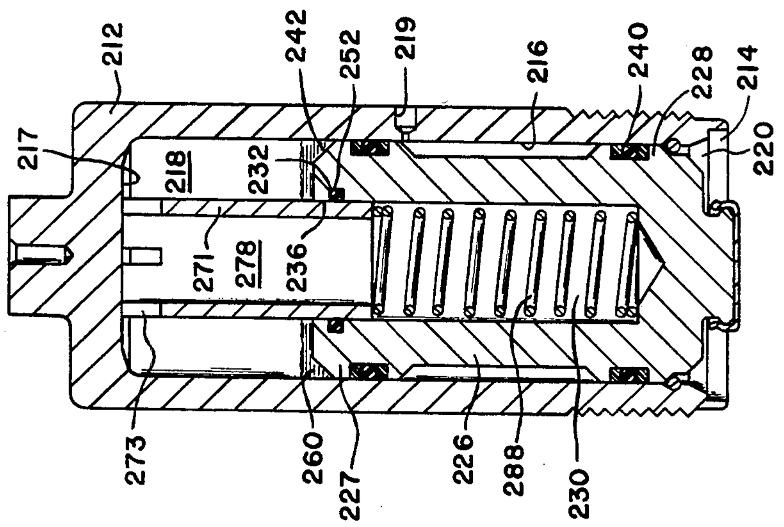
FIG. 2 is a section view of the second embodiment of the invention.

FIG. 2 illustrates a second embodiment of the present invention wherein the same or similar structure is indicated by the same reference numeral increased by 200. The housing 212 includes a bore 216 divided into first chamber 218 and second chamber 220 by piston 226. Piston 226 includes a piston bore 230, with seals 240 at the first 227 and second 228 piston ends. A cylindrical sleeve member 271 and spring 288 are received within piston bore 230, spring 280 biasing member 271 away from piston 226 and into engagement with housing bore wall 217. Sleeve member 271 includes a plurality of radial openings 273 which permit gas under pressure within first chamber 218 to communicate freely with interior through opening 278 of member 271 and piston bore 230. Piston bore 230 includes an annular groove 232 at first piston end 227, groove 232 receiving a seal 252 which effects sealing between the outer surface of sleeve member 271 and piston bore 230. Lubricating fluid 260 is disposed about first piston end 227 which includes a beveled surface 242.

Accumulator 212 is positioned in a vertically upright position within a motor vehicle (not shown) so that lubricating fluid 260 remains disposed about first piston end 227. As piston 226 reciprocates within bore 216, spring 288 ensures that the sleeve member 271 remains biased into engagement with housing wall 217. Sleeve member 271 prevents lubricating fluid 260 from entering into piston bore 230, and ensures that the lubricating fluid remains disposed about the first piston end between beveled surface 242 and the surface of bore 216. Thus, seals 240 of piston 226 remain lubricated throughtout the operational life span of accumulator 212, which operates in all respects the same as described above for the first embodiment.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

We claim:

1. A pressure accumulator, comprising a housing having a housing bore extending longitudinally within said housing, a piston having first and second piston ends disposed slidably within the bore and dividing the bore into first and second chambers, first and second fluids within the respective chambers, characterized in that the piston has a U-shaped shaped cross section including a piston bore extending from a bore opening at the first piston end, the first piston end and second piston end having respective sealing means thereat, the first fluid under high pressure within the first chamber and a lubricating fluid disposed in said first chamber at the first piston end, the bore opening being enclosed by a sleeve member received within the bore opening and extending longitudinally away from said first piston end and into said first chamber so that the lubricating fluid remains at the first piston end and does not enter into the piston bore, and the sleeve member having a sleeve opening permitting the first fluid under high pressure in the first chamber to communicate freely with the piston bore.

2. The pressure accumulator in accordance with claim 1, wherein the piston bore comprises an enlarged diameter section at the bore opening, the enlarged diameter section receiving and seating thereat an end of the sleeve member.

3. The pressure accumulator in accordance with claim 2, wherein the first piston end has at least one radial slot permitting the lubricating fluid to enter the enlarged diameter section.

4. The pressure accumulator in accordance with claim 3, wherein the first piston end includes a bevel, the lubricating fluid being disposed circumferentially about the first piston end between the bevel and adjacent surface of the housing bore.

5. The pressure accumulator in accordance with claim 4, wherein the sleeve member comprises an enlarged diameter portion seatingly received within the enlarged diameter section of the piston bore and a small diameter section having therein the sleeve opening which communicates with a central opening of the enlarged diameter portion in order to permit the first fluid in the first chamber to communicate freely with the piston bore.

6. The pressure accumulator in accordance with claim 5, wherein the sleeve member includes an annular metallic member disposed within the enlarged diameter portion in order to provide support therefor.

7. The pressure accumulator in accordance with claim 1, wherein the piston bore includes an annular groove receiving therein a seal, the seal effecting a fluid seal between the piston bore and outer surface of the sleeve member.

8. The pressure accumulator in accordance with claim 7, wherein the sleeve member comprises a cylindrical sleeve member and the sleeve opening comprises at least one radial opening at a first sleeve member end disposed within said first chamber.

9. The pressure accumulator in accordance with claim 8, further comprising a spring disposed within said piston bore between an end of the piston bore and a second sleeve member end, the spring biasing the sleeve member away from said piston bore so that said first sleeve member end engages an end wall of the first chamber.

10. The pressure accumulator in accordance with claim 9, wherein the housing bore includes vent means communicating with atmosphere.

11. The pressure accumulator in accordance with claim 10, wherein the first piston end includes a beveled surface so that lubricating fluid is disposed between the beveled surface and adjacent surface of the housing bore.

* * * * *